United States Patent
Ma et al.

(10) Patent No.: US 11,580,299 B2
(45) Date of Patent: Feb. 14, 2023

(54) CORPUS CLEANING METHOD AND CORPUS ENTRY SYSTEM

(71) Applicant: UBTECH ROBOTICS CORP LTD, Shenzhen (CN)

(72) Inventors: Li Ma, Shenzhen (CN); Youjun Xiong, Shenzhen (CN)

(73) Assignee: UBTECH ROBOTICS CORP LTD, Shenzhen (CN)

(*) Notice: Subject to any disclaimer, the term of this patent is extended or adjusted under 35 U.S.C. 154(b) by 322 days.

(21) Appl. No.: 16/886,826

(22) Filed: May 29, 2020

(65) Prior Publication Data
US 2021/0200948 A1  Jul. 1, 2021

(30) Foreign Application Priority Data
Dec. 27, 2019 (CN) .......................... 201911379646.4

(51) Int. Cl.
*G06F 40/242* (2020.01)
*G06N 20/00* (2019.01)
*G06F 40/289* (2020.01)
*G06N 7/00* (2006.01)

(52) U.S. Cl.
CPC .......... *G06F 40/242* (2020.01); *G06F 40/289* (2020.01); *G06N 7/005* (2013.01); *G06N 20/00* (2019.01)

(58) Field of Classification Search
CPC ...... G06F 40/242; G06F 40/289; G06F 40/30; G06N 7/005; G06N 20/00; G06N 3/0454; G06N 3/049
See application file for complete search history.

(56) References Cited

U.S. PATENT DOCUMENTS

| | | | | |
|---|---|---|---|---|
| 2012/0191694 A1* | 7/2012 | Gardiol | ................ | G06F 40/216 707/706 |
| 2012/0209605 A1* | 8/2012 | Hurvitz | ................ | G06F 16/685 704/235 |
| 2015/0095017 A1* | 4/2015 | Mnih | ................ | G06F 40/284 704/9 |
| 2018/0307724 A1* | 10/2018 | Shamsi | ............ | G06F 16/24522 |
| 2019/0294624 A1* | 9/2019 | Miyabe | .................. | G06F 40/20 |
| 2019/0392836 A1* | 12/2019 | Kang | ...................... | G06F 40/30 |
| 2020/0065873 A1* | 2/2020 | Ruvini | ................ | G06F 16/338 |
| 2021/0037048 A1* | 2/2021 | Kurupati | ................ | G06N 3/08 |
| 2021/0081475 A1* | 3/2021 | Pham | .................. | G06N 3/0454 |
| 2021/0182868 A1* | 6/2021 | Zhang | ................ | G06V 10/82 |

FOREIGN PATENT DOCUMENTS

WO   WO-2020261479 A1 * 12/2020

* cited by examiner

*Primary Examiner* — Pierre Louis Desir
*Assistant Examiner* — Keisha Y. Castillo-Torres (57) ABSTRACT

The present disclosure provides a corpus cleaning method and a corpus entry system. The method includes: obtaining an input utterance; generating a predicted value of an information amount of each word in the input utterance according to the context of the input utterance using a pre-trained general model; and determining redundant words according to the predicted value of the information amount of each word, and determining whether to remove the redundant words from the input utterance. In such a manner, the objectivity and accuracy of corpus cleaning can be improved.

16 Claims, 4 Drawing Sheets

CORPUS CLEANING METHOD AND CORPUS ENTRY SYSTEM

CROSS REFERENCE TO RELATED APPLICATIONS

The present disclosure claims priority to Chinese Patent Application No. 201911379646.4, filed Dec. 27, 2019, which is hereby incorporated by reference herein as if set forth in its entirety.

BACKGROUND

1. Technical Field

The present disclosure relates to corpus cleaning technology, and particularly to a corpus cleaning method and a corpus entry system.

2. Description of Related Art

In a typical human-computer dialogue system, it requires the system administrator to enter corresponding training utterances for different scenarios and intentions, and then the system can use the training utterance for training. In actual dialog scenarios, a trained model is used to identify the intention of utterance input by an end user.

A technical difficulty of such a system is that the system administrator often has very limited training utterances. In the case of sparse training utterances, the machine learning system may learn to focus on some lexical features that have nothing to do with intention identification but only exist in the corpus of certain type of intention, and this may harm the generalization of the model when making predictions. For example, suppose that the system administrator has created two intentions of "inquiring the time" and "inquiring flight" in a system, and only the prefix of "what" appears in the intention of "inquiring weather" in the training input utterances, and when identifying the intention of the input utterance "what time does my flight depart?", the system may determine the intention as "inquiring the time" just because the word "what" only appears in the training utterances of this intention, which is obviously unreasonable.

At present, a direct solution to this problem is to construct a stop word list to remove irrelevant word during training and prediction. There are currently many stop word lists available for download on the Internet, but these stop word lists are not organized specially for the intention identification task of a dialogue system. In addition, whether a word can be removed from an utterance without affecting the semantics depends not only on its literal composition, but also on the information of the context. For example, removing "will" in the utterance of "will it rain tomorrow?" will not cause any interference to semantic parsing, but for the utterance "I'd like to listen to the song 'will'", if "will" is removed, the semantic parsing will be interfered. Therefore, the current solution is flawed.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure. All other embodiments obtained by those skilled in the art without creative efforts are within the scope of the present disclosure.

Before introducing the embodiments of the present disclosure, an application scenario will be introduced as follows.

As an example, the application scenario is a human-computer dialogue system. In the following, the developer of the human-computer dialogue system is referred to as Party A, the client who purchase and deploy the platform is referred to as Party B, and the end user of the human-computer dialogue system who interact with the computer is referred to as Party C. Party A's responsibility is to design the overall architecture and machine learning model of the human-computer dialogue system, and its customer is Party B; Party B's responsibility is to use the human-computer dialogue system to enter training corpus, and formulate the response strategies of the system in specific conditions, and its customer is Party C; and Party C enters text information into the system and expects adequate responses from the system. Party B needs to use the human-computer dialogue system to enter training utterances of different intentions according to the interaction needs of its customer (i.e., Party C), assign intention and slot label to each sample utterance in the training corpus, use the entered training corpus to perform training on the basis of the machine learning model pre-designed by Party A, and use the pre-trained machine learning model to identify the intention and slot information input by Party C. Party A has all the corpora entered by all the customers of Party B, but does not directly provide a service to Party C.

Figure 1:
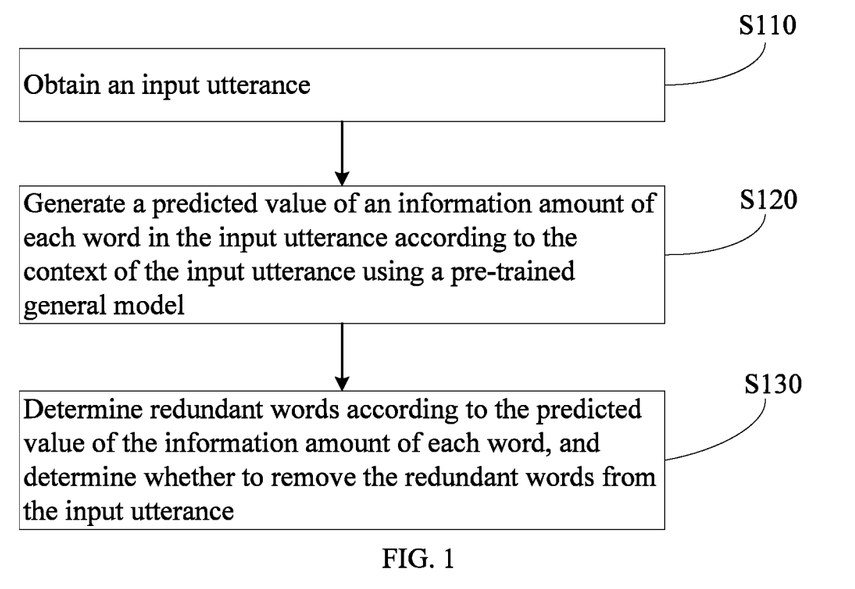
FIG. 1 is a flow chart of an embodiment of a corpus cleaning method according to the present disclosure.

FIG. 1 is a flow chart of an embodiment of a corpus cleaning method according to the present disclosure. In this embodiment, a corpus cleaning method is provided. The method is a computer-implemented method executable for a processor, which may be implemented through and applied to a corpus cleaning system shown in FIG. 3 or implemented through a computer-readable storage medium shown in FIG. 4. As shown in FIG. 1, the method includes the following steps.

S110: obtaining an input utterance.

In this embodiment, the corpus cleaning method is implemented through a corpus cleaning system. The input utterance involved herein can be input by either Party B for training or Party C for prediction and then obtained through, for example, a communication circuit 230 shown in FIG. 3.

In which, "corpus" is a text data set belonging to different domains, which is manually annotated with its domain and intention. The components of corpus are specific utterances which might be spoken by a system user to communicate with the system.

In the case that the utterances are input by Party B, the corpus cleaning system uses the input utterances to train a machine learning model designed by Party A in advance, and use the trained machine learning model to identify the redundant words in all training utterances in the corpus and clean them from the utterances before put the utterances into intention classification model for training.

In the case that Party C input an utterance in the dialogue interface, the corpus cleaning system identifies the redundant words in the utterance and clean them from the utterance before put the utterance into intention classification model for prediction.

Regardless of whether the utterance is input by Party B or Party C, the input utterance includes a plurality of words.

S120: generating a predicted value of an information amount of each word in the input utterance according to the context of the input utterance using a pre-trained general model.

Each word has its corresponding information amount in the utterance. The larger the information amount, the more important the word is to identify the intention of the utterance, and the lower the probability of being a redundant word.

The general model is trained in advance, which is used to predict the information amount of each word in the input utterance of various domains (i.e., dialogue scenarios) according to the context (i.e., other words appear in the same utterance) of the input utterance so as to generate the predicted value, that is, the predicted information amount of each word. In which, the predicted value of the predicted information amount of each word will be very similar to or even equal to the actual information amount of each word.

S130: determining redundant words according to the predicted value of the information amount of each word, and determining whether to remove the redundant words from the input utterance.

In the case that the party to input the corpus in step S110 is Party B, Party B can determine whether each word in the corpus is a redundant word according to the predicted value of the information amount of the word, and determine whether to delete the redundant word.

In an application scenario, Party B sets a predicted value threshold. When Party B clicks a trigger button of, for example, the corpus cleaning system of FIG. 3, the word whose predicted value of the information amount is lower than the predicted value threshold is determined as the redundant word and is removed from the utterance. In one embodiment in order to allow Party B to set the predicted value threshold accurately according to the predicted value of the information amount of each word and the actual situation of the word in the utterance, the input utterance can be displayed before step S130, and the predicted value of the information amount of each word in the utterance can also be displayed, so that Party B can set the predicted value threshold according to the displayed information. Alternatively, in order to save time, in other application scenarios, the information amount of each word in the utterance may not be displayed, and at this time, the predicted value threshold can be set by Party B in advance.

In another application scenario, different from the above-mentioned application scenario, the input utterance can be displayed before step S130, and at the same time, the predicted value of the information amount of each word in the utterance will be displayed. Party B determines whether the word is a redundant word according to both of the subjective judgment and the predicted value of the information amount of the word. At this time, when the user determines that a certain word is a redundant word, she or he can directly select the word by, for example, manually clicking on it, and then remove the selected word from the utterance.

In the above-mentioned two application scenarios, when displaying the utterance, the deepness of the background color of each word can correspond to its predicted value of the information amount. For example, the larger the predicted value of the information amount, the deeper the background color. That is, the predicted value of the information amount of each word in the utterance can be presented to the user in a visual way, so that the user can make determinations and selections in an intuitive manner. Alternatively, when displaying the utterance, the predicted value of the information amount of each word can also be displayed in text directly. In present disclosure, the displaying manners of the utterance and the predicted value of the information amount of each word in the utterance are not limited.

In step S110, in the case that the party to input the utterance is Party C, the word with the predicted value of the information amount smaller than the predicted value threshold can be determined as the redundant word directly according to the predicted value threshold set by Party B in advance (the predicted value threshold can be equal to or different from the above-mentioned predicted value threshold) and removed from the utterance.

In step S110, in the case that the party to input the sample utterance is Party B, the method can clean the training utterances to ensure that the trained machine learning model will eventually adequate for removing redundant words. Alternatively in the case that the party to input the utterance is Party C, the method can clean the utterance input by the user, so as to provide favorable conditions for subsequent accurate determination of its intention.

From the above, it can be seen that in the present disclosure, the pre-trained general model is used to predict the information amount of each word in an utterance, so as to remove redundant words from the utterance according to the prediction result and achieve the purpose of cleaning the corpus. In comparison with the construction of the stop word list that is subjective and arbitrary, since the general model is pre-trained on various intention classification tasks, it has better objectivity and rigor and can guarantee the objectivity and accuracy when cleaning the corpus.

In this embodiment, before step S120, the method further includes:

A: obtaining a plurality of sample utterances.

B: obtaining the information amount of each word in the sample utterance according to the context of the input utterance; and C: training the general model through the plurality of sample utterances and the information amount of each word in the sample utterances.

In this embodiment, the plurality of sample utterances in step A are utterance of various domains, and can be obtained from different Party B. For example, the plurality of sample utterances can belong to various domains such as weather, traffic, and scene.

The information amount of each word that is obtained in step B is the information gain in intention classification task of each word in the corresponding sample utterance.

In step C, when training the general model, the predicted value of the information amount of each word that is predicted by the general model is compared with the information gain in intention classification task of the word. In the case that the difference between the two is large, the general model is continuously trained, and the general model will be determined as having been trained and being convergent only when the difference between the two is small or the two are equal.

Through the above-mentioned steps, by using multiple sample utterances of different domains and the information amount of the words in the sample utterances to train the general model, it can also ensure that the trained general model is a cross-domain general model that is capable of predicting the information amount of each word in the utterances of different domains.

Figure 2:
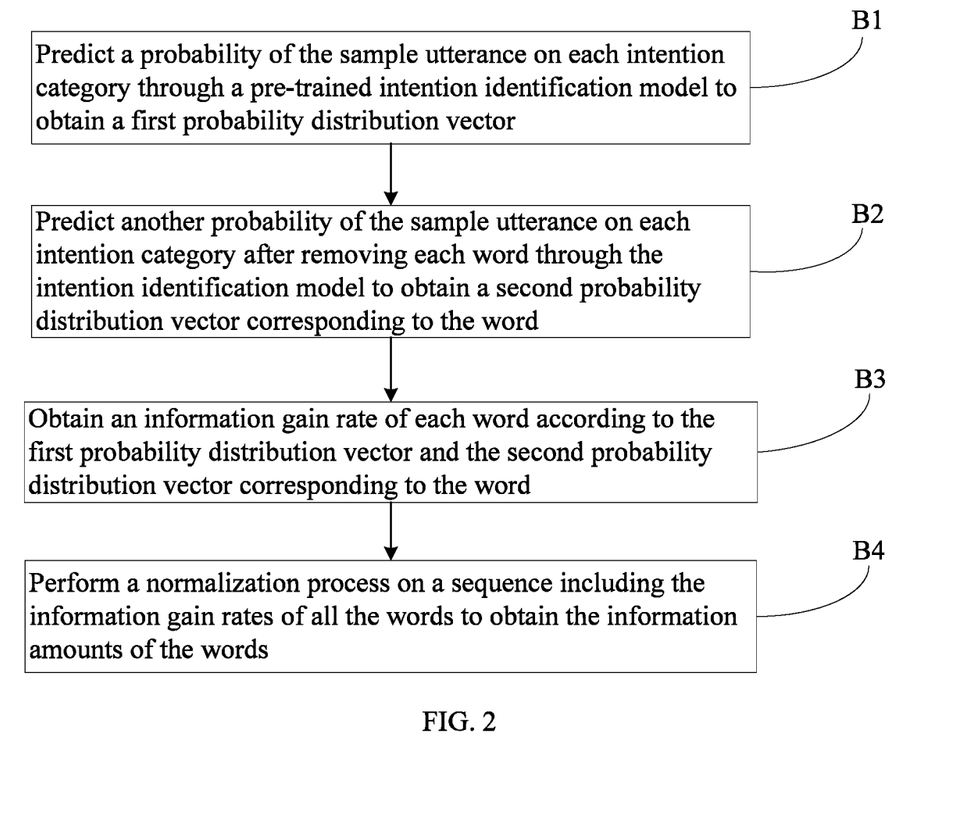
FIG. 2 is a flow chart of an example of step B in the method of the embodiment of FIG. 1.

FIG. 2 is a flow chart of an example of step B in the method of the embodiment of FIG. 1. As shown in FIG. 2, in this embodiment, the step of obtaining the information amount of each word in the sample utterance in step B may include:

B1: predicting a probability of the sample utterance on each intention category through a pre-trained intention identification model to obtain a first probability distribution vector.

In one embodiment, there is a pre-trained intention identification model for each domain that can predict the intention of the sample utterance of the domain.

In which, each of the domain includes several intentions. For example, "weather" and "traffic" are two different domains, where the domain "weather" includes the intentions such as "querying the weather", "querying the temperature", "querying the humidity", and "dress advice", and the domain "traffic" includes the intentions such as "querying the route", "querying the congestion situation", and "route recommendation".

After the intention identification model performs predictions on a sample utterance, it outputs a vector, and each dimension in the vector represents the probability of the sample utterance on each intention category. For example, when the sample utterance is "I'd like to query the weather on Monday", the intention identification model can output a corresponding vector (0.8, 0.1, 0.1) which indicates that the probability of the sample utterance to query the weather is 0.8, the probability for querying the temperature is 0.1, and the probability for dress advice is 0.1.

To facilitate understanding, step B1 shown in FIG. 2 will be introduced using a mathematical expression. As an example, step B1 can be expressed as: predicting the probability of the sample utterance S composed of a word sequence $\{w_1, w_2, \ldots, w_n\}$ on each intention category using the intention identification model, so as to obtain a first probability distribution vector P(S), where $w_i$ is the i-th word in the sample utterance S.

That is, a sample utterance is denoted as S, which consists of n words. After the sample utterance S is input into the intention identification model, the intention identification model outputs a first probability distribution vector P (S).

B2: predicting another probability of the sample utterance on each intention category after removing each word through the intention identification model to obtain a second probability distribution vector corresponding to the word.

Only one word is removed from the sample utterance at a time, and then the sample utterance is input to the intention identification model. The intention identification model predicts the probability of the sample utterance from which a certain word is removed in each intention category to obtain a second probability distribution vector corresponding to the removed word.

As shown in FIG. 2, step B2 can be expressed as: removing the word $w_i$ from the sample utterance S first, and inputting the sample utterance S with the word $w_i$ having removed into the intention identification model, and then outputting the second probability distribution vector $P(S_{-i})$ corresponding to the probability distribution of intentions if mask the word $w_i$. It can be understood that, the dimension of the second probability distribution vector $P(S_{-i})$ is the same as that of the dimension of the first probability distribution vector P(S).

B3: obtaining an information gain rate of each word according to the first probability distribution vector and the second probability distribution vector corresponding to the word.

Because the first probability distribution vector represents the probability of the complete sample utterance on each intention category, and the second probability distribution vector represents the probability of the sample utterance with a certain word having removed on each intention category, the importance of the removed word in determining the intention of the sample utterance, that is, the information gain rate of the word, can be obtained according to the first probability distribution vector and the second probability distribution vector.

As shown in FIG. 2, step B3 can be expressed as: obtaining the information gain rate $d_i$ of each word $w_i$ according to the first probability distribution vector P(S) and the second probability distribution vector $P(S_{-i})$ corresponding to the word $w_i$.

In an application scenario, the information gain rate of each word can be obtained by calculating the Euclidean distance between the first probability distribution vector and the second probability distribution vector corresponding to the word.

That is, at this time, the calculation formula of the information gain rate $d_i$ of each word $w_i$ is $$d_i = \|(P(S) - P(S_{-i}))\|_2 = \sqrt{\sum_{x=1}^{m}(p(x) - p_{-i}(x))^2},$$

where $d_i$ is the information gain rate of the i-th word in the sample utterance S, p (x) represents the x-th element in P(S), $P_{-i}$ (x) represents the x-th element in P $(S_{-i})$, and m is the number of intention categories, that is, the dimension of P(S) or P $(S_{-i})$.

In another application scenario, the information gain rate of each word can be obtained by calculating a relative entropy of the first probability distribution vector and the second probability distribution vector corresponding to the word.

That is, the calculation formula of the information gain rate of each word is $$d_i = KL(P(S)\|P(S_{-i})) = \sum_{x=1}^{m} p(x) \times \log\left(\frac{p(x)}{p_{-i}(x)}\right),$$

which is the same as the above-mentioned application scenario, where p(x) represents the x-th element in P(S), and $p_{-i}(x)$ represents the x-th element in $P(S_{-i})$, m is the number of intention categories, that is, the dimension of P(S) or $P(S_{-i})$.

In other application scenarios, the information gain rates of each word can also be obtained by calculated according to other formulas, which is not limited herein.

B4: performing a normalization process on a sequence including the information gain rates of all the words to obtain the information amounts of the words.

After step B3, a sequence D(S) corresponding to the sample utterance S is obtained, where D(S) is represented as $\{d_1, d_2, \ldots, d_n\}$, and $d_i$ is the information gain rate of the i-th word in the sample utterance S.

The information gain rate of each word obtained in step B3 may be between 0 and positive infinity. For example, the range of the Euclidean distance is between 0 and positive infinity, and the range of relative entropy is also between 0 and positive infinity. Therefore, for the convenience of subsequent training, the sequence including the information gain rates of all words, that is, the sequence D(S) is normalized to obtain T(S), where T(S) is expressed as $\{t_1, t_2, \ldots, t_n\}$, and $t_i$ is the information amount of the i-th word in the sample utterance S.

As shown in FIG. 2, step B4 can be expressed as: performing a normalization on $\{d_1, d_2, \ldots, d_n\}$ to obtain T(S), where T(S) is expressed as $\{t_1, t_2, \ldots, t_n\}$, and $t_i$ is the normalized information amount of the i-th word in the sample utterance S.

Each element in the vector is divided by the maximum of all element in the vector, where the formula is:

$$t_i = d_i / \max(d_1, d_2, \ldots, d_n);$$

where, $d_i$ is the original information gain rate of the i-th word in the sample utterance S, and $t_i$ is the normalized information amount of the i-th word in the sample utterance S.

In order to facilitate the further understanding to step B, specific examples will be introduced as follows.

In the case that the sample utterance S is "I'd like to query the weather on Monday", it is automatically segmented first and the sample utterance S is denoted as {I, like, query, weather, Monday}, that is, the sample utterance S includes 5 words.

Then, the intention identification model predicts the sample utterance S on the three intention categories of querying the weather, querying the temperature, and dressing advice, and outputs the first probability distribution vector P(S). Assuming that the first probability distribution vector P(S) is (0.8, 0.1, 0.1), which indicates that the probability of the sample utterance S to query the weather is 0.8, the probability for querying the temperature is 0.1, and the probability for dressing advice is 0.1.

Furthermore, these 5 words are sequentially removed from the sample utterance S, the 5 sample utterances S with the words having removed are input into the intention identification model, and the intention identification model predict each of the 5 sample utterance S information again in three intention categories of querying the weather, querying the temperature, and dressing advice to obtain 5 second probability distribution vectors $P(S_{-i})$. Assuming that among these 5 second probability distribution vectors $P(S_{-i})$, the second probability distribution vector $P(S_{-5})$ corresponding to the fifth word "weather" is (0.4, 0.3, 0.3), which indicates that the probability of the sample utterance S with "weather" having removed to query the weather is 0.4, the probability for querying the temperature is 0.3, and the probability for dressing advice is 0.3.

Still furthermore, the information gain rate $d_i$ of each of the five words is calculated according to the first probability distribution vector P(S) and its corresponding second probability distribution vector $P(S_{-i})$. For example, the information gain rate $d_5$ of "weather" can be calculated according to the above-mentioned P(S) and $P(S_{-5})$. Specifically, an example of a method which calculates using the Euclidean distance may be:

$$d_5 = \|(P(S) - P(S_{-5}))\|_2 = \sqrt{\sum_{x=1}^{3}(p(x) - p_{-5}(x))^2} = \sqrt{(0.8-0.4)^2 + (0.1-0.3)^2 + (0.1-0.3)^2}.$$

After obtaining the values of $d_1$-$d_5$, the information gain rate of each word is composed into a sequence D(S) as $\{d_1, d_2, d_3, d_4, d_5\}$, and then the sequence D(S) is normalized to obtain the sequence T(S) as $\{t_1, t_2, t_3, t_4, t_5\}$, that is, the information amount corresponding to each of the above-mentioned 5 words is obtained.

In the above-mentioned process of obtaining the information amount of the word, the influence of the word on the determination of the intention in a certain context (i.e., the context in which the word is located) is fully taken into account.

In this embodiment, step A can include:

A1: obtaining an initial utterance from a plurality of corpora;

A2: selecting a word from a dictionary corresponding to each word slot in the initial utterance in a random manner to fill the word slot to obtain the sample utterance, if the initial utterance includes a word slot; and A3: using the initial utterance as the sample utterance, if the initial utterance not includes the word slot.

In this embodiment, in the case that the utterance in step S110 is input by Party B, the initial utterance input by Party B may include a word slot such as the word slot "place", and then the initial utterance is filled by, for example, randomly selecting a word such as "Paris" from a dictionary corresponding to "place" so as to perform filling and obtain the sample utterance, that is, the eventually obtained sample utterance does not include the word slot.

At this time, since the value of the word slot is very important, for identifying the intention of the utterance, the method can further include the following steps after step B4:

B5: determining whether the word in the sample utterance is obtained by filling the word slot in the initial utterance;

B6: if yes, updating the information amount of the word to 1; and

B7: if no, keeping the information amount of the word unchanged.

After normalizing the sequence D(S), if it is found that a certain word in the sample utterance is obtained by filling the word slot in the initial utterance, that is, the word is the value of the word slot, regardless of the previously calculated actual value of the information amount, the information amount of the word is forcibly set to 1; otherwise, if the word is not obtained by filling the word slot, the previously calculated information amount is maintained.

In this embodiment, the trained general model can be a deep learning model inputting a word sequence and outputting real numbers between 0 and 1 corresponding to each word in the input sequence.

In an application scenario, during the training, a word embedding vector corresponding to each word $w_i$ in the sample utterance S is used as the input of each time step of the model, and a hidden layer corresponding to the word $w_i$ is output and mapped into a scalar after a linear transformation, then the scalar is mapped to a scalar of a range (0, 1) by mapping through the sigmoid activation function and output as the predicted value of the information amount corresponding to the word $w_i$.

At the same time, during the training, the general model uses binary cross entropy as the loss function.

In an application scenario, whether the general model is convergent or not during training is determined using the following loss function:

$$BCE(w_1, w_2, \ldots, w_n) = -\frac{1}{n}\sum_{i=1}^{n}(t_i \times \log(\hat{t}_i) + (1 - t_i) \times \log(1 - \hat{t}_i));$$

where, $t_i$ is the actual information amount of the i-th word in the sample utterance S, and $\hat{t}$ is the predicted value of the information amount of the i-th word in the sample utterance S that is predicted by the general model. The smaller the calculated value $BCE(w_1, w_2 \ldots w_n)$, the closer the predicted value of the information amount predicted by the general model to the actual information amount, and subsequently the degree of the convergence of the general model can be determined based on the value $BCE(w_1, w_2 \ldots w_n)$.

Figure 3:
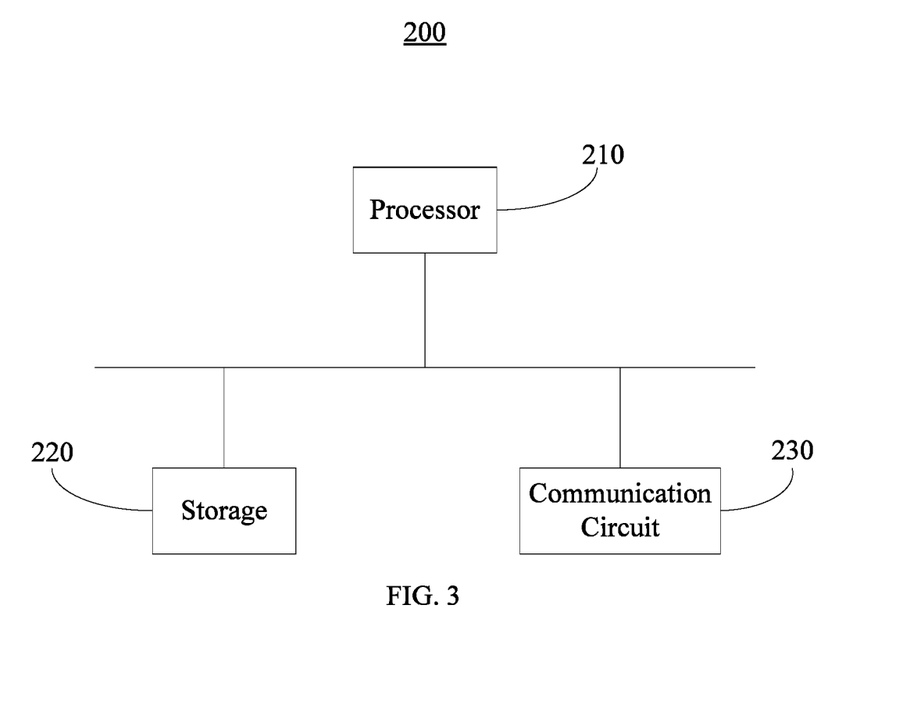
FIG. 3 is a schematic block diagram of an embodiment of a corpus cleaning system according to the present disclosure.

FIG. 3 is a schematic block diagram of an embodiment of a corpus cleaning system according to the present disclosure. As shown in FIG. 3, a corpus entry system 200 is provided. The corpus entry system 200 includes a processor 210, a storage 220, and a communication circuit 230 such as an Ethernet communication circuit or a wireless communication circuit. The processor 210 is coupled to each of the storage 220 and the communication circuit 230. The processor 210 executes instructions stored in the storage 220 to implement the steps of the method in any one of the above-mentioned embodiments. For details of the method, refer to the foregoing related content, which are not described herein.

In which, the corpus entry system 200 can be a system or an apparatus with corpus entry function, for example, a mobile phone or a computer, which is not limited herein.

In this embodiment, each of the above-mentioned modules/units is implemented in the form of software, which can be computer program(s) stored in a memory of the corpus entry system 200 and executable on a processor of the corpus entry system 200. In other embodiments, each of the above-mentioned modules/units may be implemented in the form of hardware (e.g., a circuit of the corpus entry system 200 which is coupled to the processor of the corpus entry system 200) or a combination of hardware and software (e.g., a circuit with a single chip microcomputer).

Figure 4:
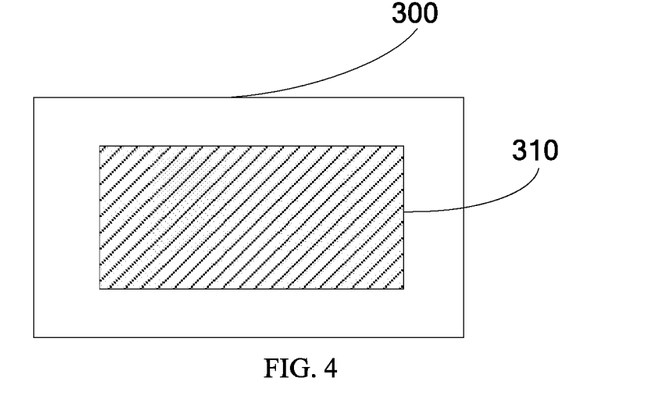
FIG. 4 is a schematic block diagram of an embodiment of a computer-readable storage medium according to the present disclosure.

FIG. 4 is a schematic block diagram of an embodiment of a computer-readable storage medium according to the present disclosure. As shown in FIG. 4, a non-transitory computer-readable storage medium is provided. The computer-readable storage medium 300 stores instructions 310 that can be executed by a processor to implement the steps of the method in any one of the foregoing embodiments.

The computer-readable storage medium 300 may be various devices such as a server, a USB disk, a mobile hard disk, a read-only memory (ROM), a random access memory (RAM), a magnetic disk, or an optical disk.

All in all, in the present disclosure, the pre-trained general model is used to predict the information amount of each word in the utterance, so as to remove redundant words from the utterance according to the prediction result and achieve the purpose of cleaning the corpus. In comparison with the construction of the stop word list that is subjective and arbitrary, since the general model is pre-trained on various intention classification tasks, it has better objectivity and rigor and can guarantee the objectivity and accuracy when cleaning the corpus.

The forgoing are only the embodiments of the present disclosure, which do not limit the scope of the present disclosure. Any equivalent structure or process transformation made using the description and drawings of the present disclosure, or direct or indirect applications to other related technologies, should be all included within the scope of the present disclosure.

What is claimed is:

1. A computer-implemented corpus cleaning method, comprising:

providing a corpus entry system comprising a processor and a communication circuit electrically coupled to the processor;

obtaining, by the communication circuit, an input utterance, wherein the input utterance is obtained from the communication circuit, the input utterance comprises computerized text, and the text contains words;

obtaining, by the processor, a plurality of sample utterances;

predicting, by the processor, a probability of each of the sample utterances on each intention category through a pre-trained intention identification model to obtain a first probability distribution vector;

predicting, by the processor, another probability of each of the sample utterances on each intention category after removing each word in the sample utterance through the intention identification model to obtain a second probability distribution vector corresponding to the word;

obtaining, by the processor, an information gain rate of each word in each of the sample utterances according to the first probability distribution vector and the second probability distribution vector corresponding to the word;

performing, by the processor, a normalization process on a sequence comprising the information gain rates of all the words in each of the sample utterances to obtain information amounts of the words;

training, by the processor, the general model through the plurality of sample utterances and an information amount of each word in each of the sample utterances;

generating, by the processor, a predicted value of the information amount of each word in the input utterance according to context of the input utterance using a pre-trained general model; and determining, by the processor, redundant words in the input utterance according to the predicted value of the information amount of each word, and removing the redundant words from the input utterance.

2. The method of claim 1, wherein the step of obtaining, by the processor, the information gain rate of each word according to the first probability distribution vector and the second probability distribution vector corresponding to the word comprises:

obtaining the information gain rate of each word by calculating the Euclidean distance between the first probability distribution vector and the second probability distribution vector corresponding to the word.

3. The method of claim 1, wherein the step of obtaining, by the processor, the information gain rate of each word according to the first probability distribution vector and the second probability distribution vector corresponding to the word comprises:

obtaining the information gain rate of each word by calculating a relative entropy of the first probability distribution vector and the second probability distribution vector corresponding to the word.

4. The method of claim 1, wherein the step of obtaining, by the processor, the plurality of sample utterances comprises:

obtaining an initial utterance from a plurality of corpora;
selecting a word from a dictionary corresponding to each word slot in the initial utterance in a random manner to fill the word slot to obtain the sample utterance, in response to the initial utterance comprising a word slot; and
using the initial utterance as the sample utterance, in response to the initial utterance not comprising the word slot;
after the step of performing the normalization process on the sequence comprising the information gain rates of all the words to obtain the information amounts of the words further comprises:
determining whether the word in the sample utterance is obtained by filling the word slot in the initial utterance; and
if yes, updating the information amount of the word to 1.

5. The method of claim 1, wherein the general model is a deep learning model inputting a word sequence and outputting real numbers between 0 and 1 corresponding to each word in the input sequence, and the general model uses binary cross entropy as a loss function during training.

6. The method of claim 1, wherein before the step of determining, by the processor, the redundant words in the input utterance according to the predicted value of the information amount of each word in the specific context, and removing the redundant words from the input utterance further comprises:

displaying the utterance, wherein a background color depth of each word in the utterance corresponds to the predicted value of the information amount of the word.

7. The method of claim 6, wherein the step of determining, by the processor, the redundant words in the input utterance according to the predicted value of the information amount of each word in the specific context, and removing the redundant words from the input utterance comprises:

removing a word selected by a user from the utterance.

8. The method of claim 6, wherein the step of determining, by the processor, the redundant words in the input utterance according to the predicted value of the information amount of each word in the specific context, and removing the redundant words from the input utterance comprises:

removing a word with the predicted value of the information amount lower than a predicted value threshold in response to a trigger instruction from the utterance.

9. The method of claim 1, wherein for each of the words in the input utterance, the context of the input utterance is other words in the input utterance.

10. A corpus entry system, comprising:
a memory;
a processor; and
one or more computer programs stored in the memory and executable on the processor, wherein the one or more computer programs comprise:
instructions for obtaining an input utterance, wherein the input utterance is obtained from a communication circuit, the input utterance comprises computerized text, and the text contains words;
instructions for obtaining a plurality of sample utterances;
instructions for predicting a probability of each of the sample utterances on each intention category through a pre-trained intention identification model to obtain a first probability distribution vector;
instructions for predicting another probability of each of the sample utterances on each intention category after removing each word through the intention identification model to obtain a second probability distribution vector corresponding to the word;
instructions for obtaining an information gain rate of each word in each of the sample utterances according to the first probability distribution vector and the second probability distribution vector corresponding to the word;
instructions for performing a normalization process on a sequence comprising the information gain rates of all the words in each of the sample utterances to obtain the information amounts of the words;
instructions for training the general model through the plurality of sample utterances and the information amount of each word in each of the sample utterance;
instructions for generating a predicted value of an information amount of each word in the input utterance according to context of the input utterance using a pre-trained general model; and
instructions for determining redundant words in the input utterance according to the predicted value of the information amount of each word, and removing the redundant words from the input utterance.

11. The system of claim 10, wherein the instructions for obtaining the information gain rate of each word according to the first probability distribution vector and the second probability distribution vector corresponding to the word comprise:

instructions for obtaining the information gain rate of each word by calculating the Euclidean distance between the first probability distribution vector and the second probability distribution vector corresponding to the word.

12. The system of claim 10, wherein the instructions for obtaining the information gain rate of each word according to the first probability distribution vector and the second probability distribution vector corresponding to the word comprise:

instructions for obtaining the information gain rate of each word by calculating a relative entropy of the first probability distribution vector and the second probability distribution vector corresponding to the word.

13. The system of claim 10, wherein the instructions for obtaining the plurality of sample utterances comprise:

instructions for obtaining an initial utterance from a plurality of corpora;
instructions for selecting a word from a dictionary corresponding to each word slot in the initial utterance in a random manner to fill the word slot to obtain the sample utterance, in response to the initial utterance comprising a word slot; and
instructions for using the initial utterance as the sample utterance, in response to the initial utterance not comprising the word slot;
the one or more computer programs further comprise:
instructions for determining whether the word in the sample utterance is obtained by filling the word slot in the initial utterance; and instructions for if yes, updating the information amount of the word to 1.

14. The system of claim 10, wherein the general model is a deep learning model inputting a word sequence and outputting real numbers between 0 and 1 corresponding to each word in the input sequence, and the general model uses binary cross entropy as a loss function during training.

15. The system of claim 10, wherein the one or more computer programs further comprise:
instructions for displaying the utterance, wherein a background color depth of each word in the utterance corresponds to the predicted value of the information amount of the word.

16. The system of claim 10, wherein for each of the words in the input utterance, the context of the input utterance is other words in the input utterance.

* * * * *